United States Patent
Burton et al.

(10) Patent No.: US 7,405,551 B2
(45) Date of Patent: Jul. 29, 2008

(54) METHOD AND AN APPARATUS TO ADJUST DUTY CYCLE FOR VOLTAGE SUPPLY REGULATION

(75) Inventors: Edward A. Burton, Hillsboro, OR (US); Robert Greiner, Beaverton, OR (US); Anant Deval, Beaverton, OR (US); Douglas R. Huard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 11/430,788

(22) Filed: May 8, 2006

(65) Prior Publication Data

US 2007/0257649 A1 Nov. 8, 2007

(51) Int. Cl.
*G05F 5/00* (2006.01)
(52) U.S. Cl. .................. 323/299; 323/271; 323/283
(58) Field of Classification Search ................ 323/271, 323/282, 283, 299
See application file for complete search history.

(56) References Cited

U.S. PATENT DOCUMENTS

| | | | |
|---|---|---|---|
| 6,954,054 B2 * | 10/2005 | Brown | 323/283 |
| 6,977,488 B1 * | 12/2005 | Nogawa et al. | 323/271 |
| 7,027,944 B2 | 4/2006 | Tabaian et al. | |
| 7,123,104 B2 | 10/2006 | Bostak et al. | |
| 7,215,108 B2 * | 5/2007 | Inn et al. | 323/285 |
| 7,221,130 B2 * | 5/2007 | Ribeiro et al. | 323/271 |
| 7,292,016 B2 * | 11/2007 | Wake | 323/271 |
| 2006/0145678 A1 * | 7/2006 | Ribeiro et al. | 323/299 |

* cited by examiner

*Primary Examiner*—Jeffrey L Sterrett
(74) *Attorney, Agent, or Firm*—Blakely, Sokoloff, Taylor & Zafman LLP (57) ABSTRACT

A method and an apparatus to regulate voltage supply have been disclosed. In one embodiment, the apparatus includes a power converter block to generate an output voltage from an input voltage and a voltage regulator controller coupled to the power converter block to input at least one time-modulated signal to the power converter block, the at least one time-modulated signal having a duty cycle, the voltage regulator controller including a counter having an increment value substantially proportional to the input voltage, wherein the counter is used to adjust the duty cycle of the at least one time-modulated signal. Other embodiments have been claimed and described.

15 Claims, 8 Drawing Sheets

METHOD AND AN APPARATUS TO ADJUST DUTY CYCLE FOR VOLTAGE SUPPLY REGULATION

TECHNICAL FIELD

Embodiments of the invention relate generally to semiconductor circuits, and more particularly, to voltage regulators.

BACKGROUND

Many conventional computing systems typically include voltage regulators to regulate voltage supply input to the computing systems. In general, the output voltage ($V_{out}$) of a voltage regulator is approximately $V_{out} = V_{in} * T_{hi}/T_{period}$, where $V_{in}$ is the input voltage to the voltage regulator, $T_{hi}$ is the period of time in which $V_{in}$ is above a certain threshold (also referred to as being high), and $T_{period}$ is the period of $V_{in}$. $T_{hi}/T_{period}$ is also commonly referred to as the duty cycle of $V_{in}$. Rather than directly working from the above equation, many voltage regulators use closed loop control to find the appropriate high time that yields the desired $V_{out}$.

When a computing system, such as a portable personal computer (a.k.a. a laptop computer), is connected to or disconnected from an alternating current (AC) power supply (a.k.a. wall power) while being powered on, the $V_{in}$ transient produces a $V_{out}$ transient, which the closed loop control has to correct. Prior to correction, there may be a $V_{out}$ transient, which may potentially be high enough to damage circuits in the computing systems. Thus, to prevent potential damage to the computing systems, the $V_{out}$ transient has to be guardbanded around. However, the increased guardband may in turn force a higher voltage, which may drain a portable power source of the computing system (e.g., a battery) more quickly.

A conventional solution to the above problem is to sense $V_{in}$ and to adjust the duty cycle of $V_{in}$ accordingly. Specifically, one conventional technique is to multiply $T_{hi}$ by the ratio ($V_{in\_old}/V_{in\_new}$), where $V_{in\_old}$ is the previous value of $V_{in}$ and $V_{in\_new}$ is the current value of $V_{in}$. However, the ratio implies a division by $V_{in\_new}$, which is a very costly digital logic function to implement in semiconductor circuits.

BRIEF DESCRIPTION OF THE DRAWINGS

Embodiments of the present invention is illustrated by way of example and not limitation in the figures of the accompanying drawings, in which like references indicate similar elements and in which.

DETAILED DESCRIPTION

A method and an apparatus to regulate voltage supply are disclosed. In the following detailed description, numerous specific details are set forth in order to provide a thorough understanding. However, it will be apparent to one of ordinary skill in the art that these specific details need not be used to practice some embodiments of the present invention. In other circumstances, well-known structures, materials, circuits, processes, and interfaces have not been shown or described in detail in order not to unnecessarily obscure the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
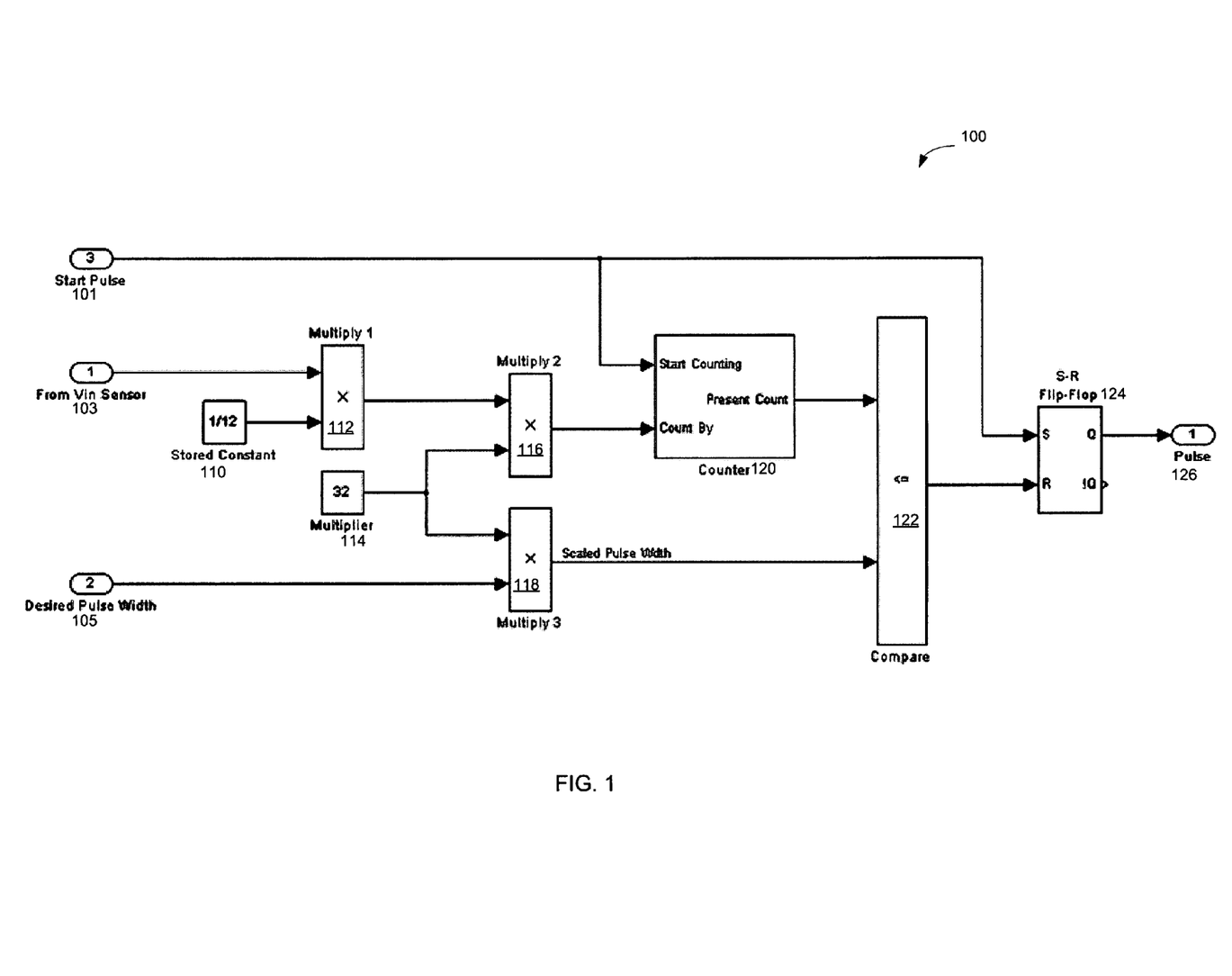
FIG. 1 shows one embodiment of a pulse width modulator.
Figure 4A:
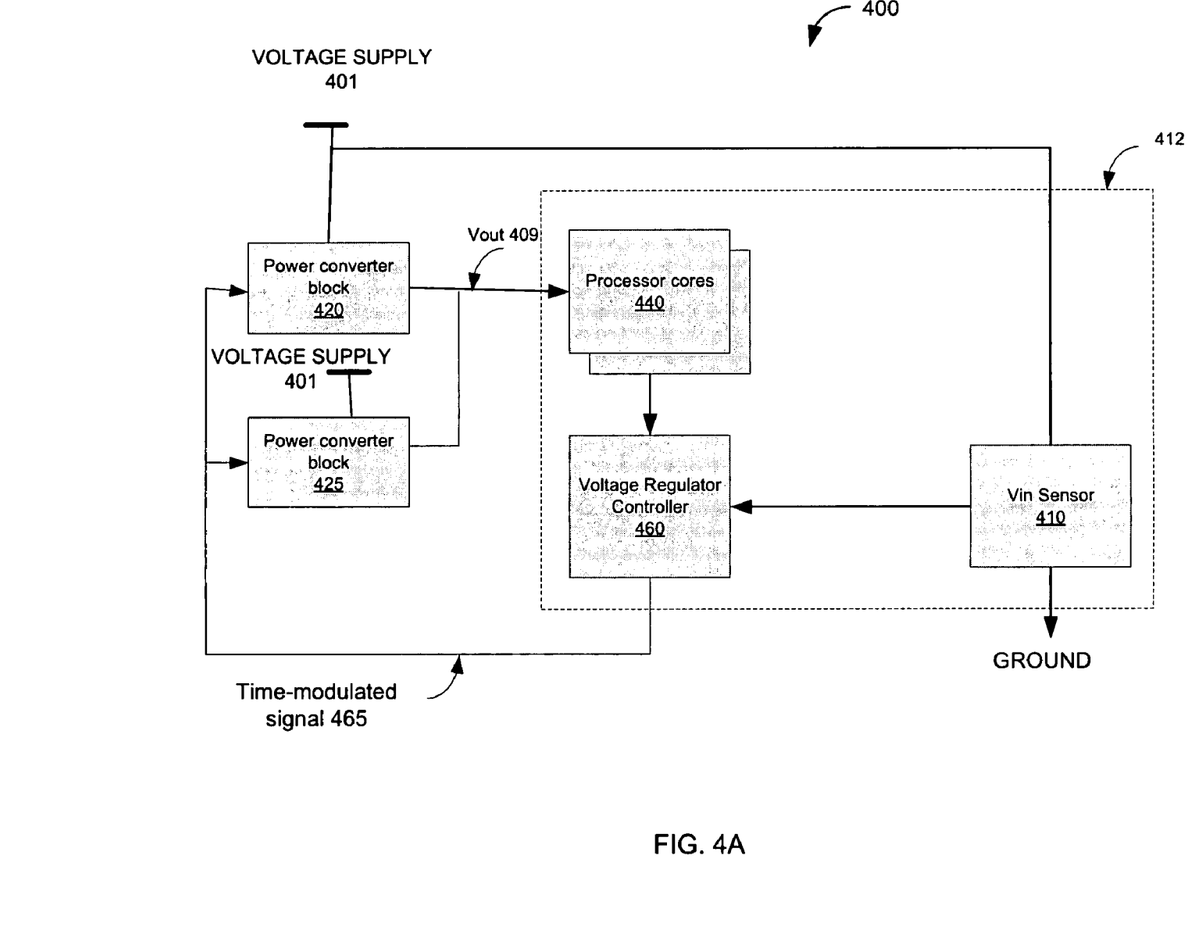
FIG. 4A illustrates one embodiment of a power block in a computing system.
Figure 4B:
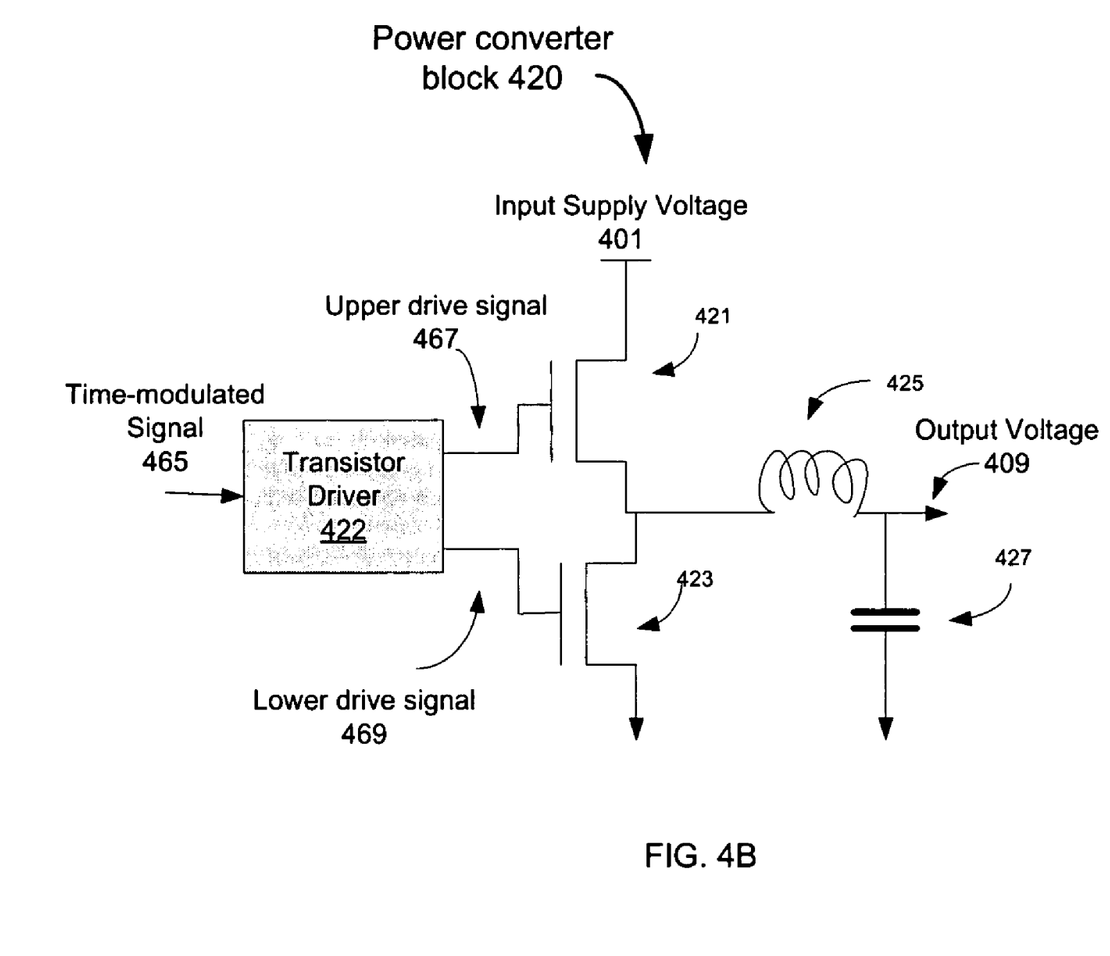
FIG. 4B illustrates one embodiment of a power converter block.

FIG. 1 shows one embodiment of a voltage regulator controller. The voltage regulator controller 100 may be usable in a voltage regulator (e.g., a synchronous buck regulator) in a computing system to provide a loop-back control signal to the voltage regulator. The voltage regulator controller 100 includes a first storage device 110 (e.g., a register) to store a constant, a second storage device 114 (e.g., a register) to store a multiplier, a first multiplier circuit 112, a second multiplier circuit 116, a third multiplier circuit 118, a counter 120, a comparator 122, and a set-reset (S-R) flip-flop 124. The voltage regulator controller 100 receives a start pulse 101, a signal 103 from an input voltage sensor, and a value of a desired pulse width 105. Based on the above inputs, the voltage regulator controller 100 outputs an output pulse 126. The input voltage sensor that provides the signal 103 senses an input voltage to the voltage regulator coupled to the voltage regulator controller 100. More details of one embodiment of a power block configuration including the voltage regulator and the pulse width modulator are discussed below with reference to FIG. 4.

In one embodiment, the components of the voltage regulator controller 100 are coupled to each other as follows. The input signal 103 from the input voltage sensor and the stored constant from the first storage device 110 are input to the first multiplier circuit 112. An output of the multiplier circuit 112 and the multiplier stored in the second storage device 114 are input to the second multiplier circuit 116. The multiplier stored in the second storage device 114 and the desired pulse width 105 are input to the third multiplier circuit 118, which generates a scaled pulse width. The output of the second multiplier circuit 116 and the start pulse 101 are input to the counter 120. The counter 120 outputs a count (also referred to as the present count), which is input to the comparator 122 with the scaled pulse width from the third multiplier 118. An output of the comparator 122 is input to the R-port of the S-R flip-flop 124 while the start pulse 101 is input to the S-port of the S-R flip-flop 124. The S-R flip-flop 124 generates the output pulse 126 at the data output terminal Q.

In some embodiments, the voltage regulator controller 100 adjusts the pulse width of the output pulse 126 as the input voltage changes to keep the gain of the voltage regulator substantially constant. For example, if the input voltage to the voltage regulator doubles, the pulse width has to be cut in half to keep the overall gain of the voltage regulator substantially constant. Likewise, if the input voltage is cut in half, the output pulse width has to be doubled. In some embodiments, the pulse width modulator gain ($G_{PWM}$) is a function of the input voltage ($V_{in}$) according to the following equation:

$$G_{PWM} = V_{in} * F_{SW} / UCLK,$$

where $F_{SW}$ is the pulse width modulation frequency and UCLK is the counter clock frequency.

A nominal input voltage ($V_{nom}$) may be selected at which the pulse width may not be adjusted. If the actual $V_{in}$ is larger than $V_{nom}$, the pulse width may be shortened. Conversely, if the actual $V_{in}$ is smaller than $V_{nom}$, the pulse width may be lengthened. In other words, the actual pulse width is:

$$\text{Actual Pulse Width} = \text{Desired Pulse Width} * V_{nom} / V_{in},$$

where the value of the reciprocal of $V_{nom}$ may be stored as a constant in the first storage device 110. For example, if the nominal voltage is about 12 V, then the constant held by the first storage device 110 is about 1/12.

Furthermore, a multiplier is selected based on the desired resolution at which the pulse width may be adjusted. For example, a multiplier of 32 may be selected. Then the pulse width may be adjusted in increments of 32 clock cycles. In one embodiment, the value of the multiplier is stored in the second storage device 114. Based on the above analysis, the pulse width modulator 110 may operate as follows to generate the output pulse 126 to regulate $V_{in}$.

In one embodiment, the first multiplier circuit 112 multiplies the signal 103 from the input voltage sensor by the stored constant in the storage device 110. Since the stored constant in the storage device 110 is substantially equal to the inverse of $V_{nom}$ (i.e., $1/V_{nom}$) and the signal 103 is substantially equal to $V_{in}$, the output from the first multiplier circuit 112 is substantially equal to $V_{in}/V_{nom}$. The first multiplier circuit 112 provides the output, $V_{in}/V_{nom}$, to the second multiplier circuit 116, which multiplies $V_{in}/V_{nom}$ with the stored constant in the storage device 114, i.e., the multiplier selected. Thus, the output of the second multiplier circuit 116 is a number substantially proportional to $V_{in}$. The second multiplier circuit 116 provides this output to the counter 120. The counter 120 starts counting in response to the start pulse 101 and counts by the value output by the second multiplier circuit 116. The value output by the second multiplier circuit 116 may be referred to as an increment value or a count-by value. As mentioned above, the output of the second multiplier circuit 116 is a number substantially proportional to $V_{in}$, and thus, the counter 120 counts by an increment value substantially proportional to $V_{in}$. Note that the increment value may be positive or negative in different embodiments. The factor $1/V_{in}$ may be applied to adjust the pulse width by modulating the increment value of the counter 120. The counter 120 outputs a count to the comparator 122. The comparator 122 also receives the scaled pulse width from the third multiplier circuit 118. The scaled pulse width is generated by multiplying the desired pulse width 105 with the multiplier from the second storage device 114. The comparator 122 compares the present count from the counter 120 with the scaled pulse width from the third multiplier circuit 118 and outputs a signal to the R-port of the S-R flip-flop 124. The S-R flip-flop 124 receives the start pulse 101 at the S-port. The output pulse 126 from the S-R flip-flop 124 goes high at a rising transition of the start pulse 101. When the count from the counter 120 reaches the value of the scaled pulse width, the comparator 122 outputs a logical "1" to the S-R flip-flop 124 to reset the output pulse 126. In other words, the output pulse 126 goes high at a rising transition of the start pulse 101 and remains high until the count from the counter 120 reaches the value of the scaled pulse width. Some examples are discussed below to further illustrate the operation of the voltage regulator controller 100.

In a first example, both the nominal voltage and the input voltage are at about 12 V and the desired pulse width 105 is about 10 units. The multiplier in the second storage device 114 is chosen to be 32. Since the nominal voltage and the input voltage are substantially equal, the output pulse width should be about the same as the desired pulse width, i.e., 10 units. Using the above values, the second multiplier circuit 116 generates a count by value as follows:

$$\text{Count By Value} = V_{in} * (1/V_{nom}) * \text{multiplier} = 12 * (1/12) * 32 = 32.$$

Figure 2A:
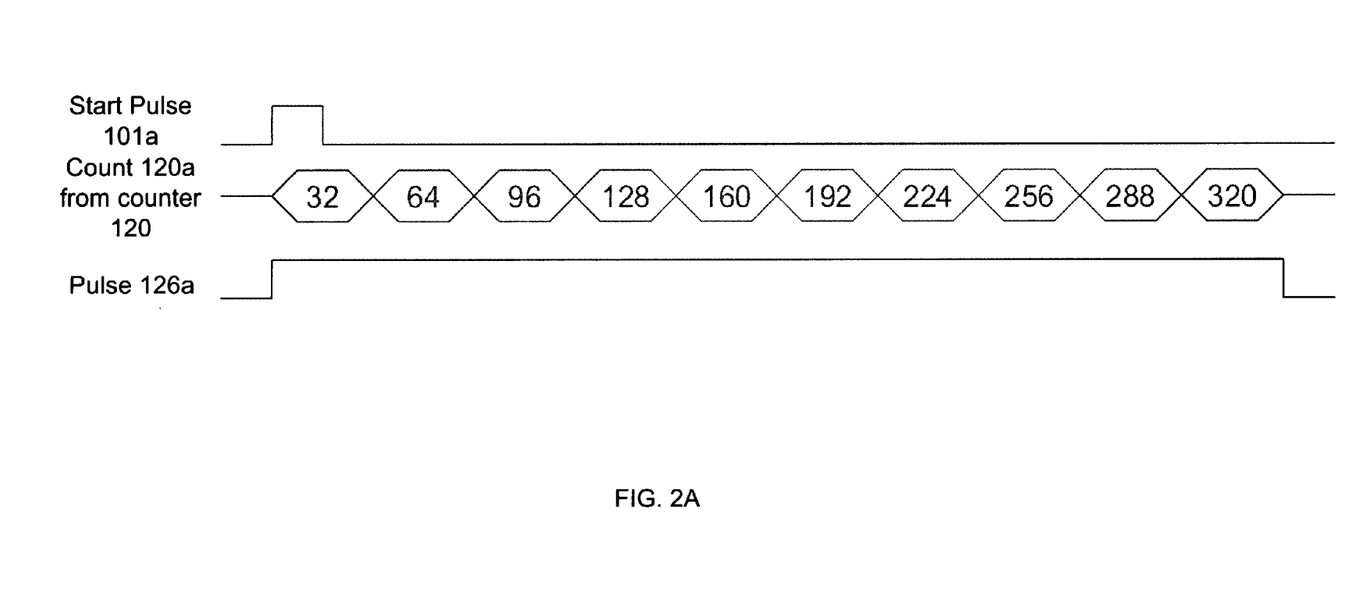
FIG. 2A shows a first exemplary pulse generated by one embodiment of the pulse width modulator.

The scaled pulse width generated by the third multiplier circuit 118 is: 10*32=320. When the start pulse 101 is asserted, the output pulse 126 goes high and the counter 120 starts counting to the desired pulse width (i.e., 320) by the count by value (i.e., 32). The counter 120 takes 320/32=10 counts to count to 320. Thus, the output pulse 126 goes low when the count of the counter 120 reaches 320 in 10 counts. The waveforms of the start pulse 101a, the count 120a output by the counter 120, and the output pulse 126a in this example are illustrated in FIG. 2A.

In a second example, the nominal voltage remains at 12V while the input voltage increases to 24 V. The desired pulse width 105 is about 10 units. The multiplier in the second storage device 114 is chosen to be 32. Since the input voltage is twice as large as the nominal voltage in the current example, the output pulse width should be about half as wide as the desired pulse width, i.e., 5 units. Using the above values, the second multiplier circuit 116 generates a count by value as follows:

$$\text{Count By Value} = V_{in} * (1/V_{nom}) * \text{multiplier} = 24 * (1/12) * 32 = 64.$$

Figure 2B:
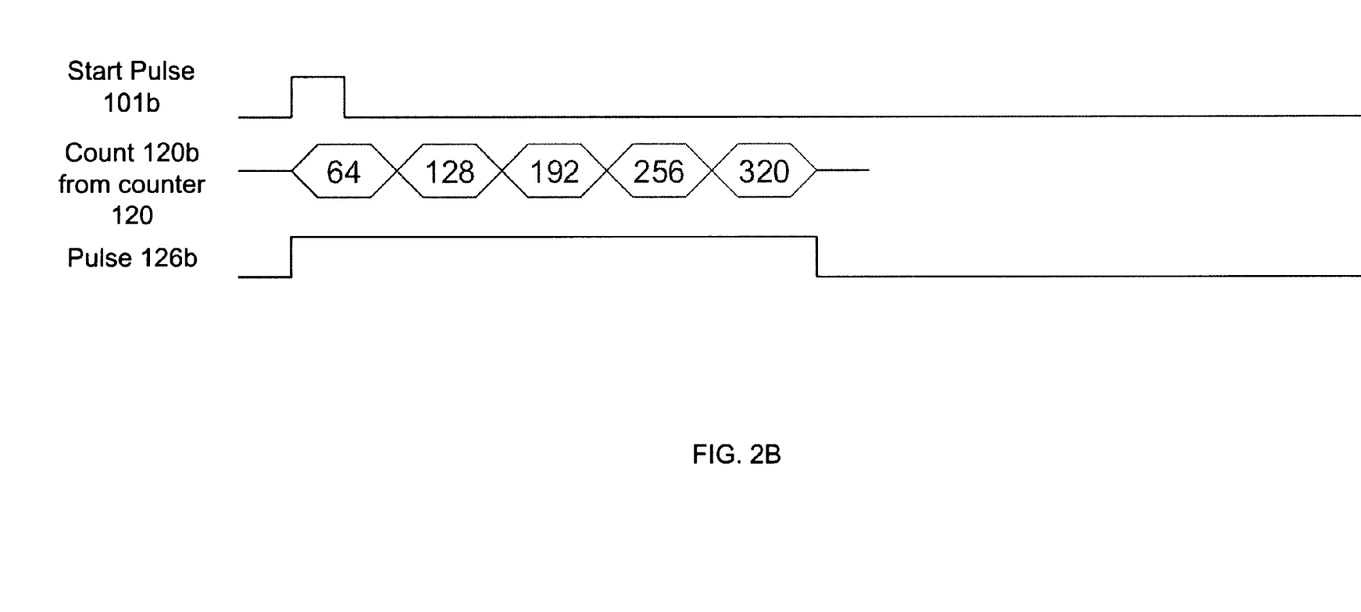
FIG. 2B shows a second exemplary pulse generated by one embodiment of the pulse width modulator.

The scaled pulse width generated by the third multiplier circuit 118 is: 10*32=320. When the start pulse 101 is asserted, the output pulse 126 goes high and the counter 120 starts counting to the desired pulse width (i.e., 320) by the count by value (i.e., 64). The counter 120 takes 320/64=5 counts to count to 320. Thus, the output pulse 126 goes low when the count from the counter 120 reaches 320 in 5 counts. The waveforms of the start pulse 101b, the count 120b output by the counter 120, and the output pulse 126b in this example are illustrated in FIG. 2B.

In a third example, the nominal voltage remains at 12V while the input voltage decreases to 6 V. The desired pulse width 105 is about 10 units. The multiplier in the second storage device 114 is chosen to be 32. Since the input voltage is twice as large as the nominal voltage in the current example, the output pulse width should be about twice as wide as the desired pulse width, i.e., 20 units. Using the above values, the second multiplier circuit 116 generates a count by value as follows:

$$\text{Count By Value} = V_{in} * (1/V_{nom}) * \text{multiplier} = 6 * (1/12) * 32 = 16.$$

Figure 2C:
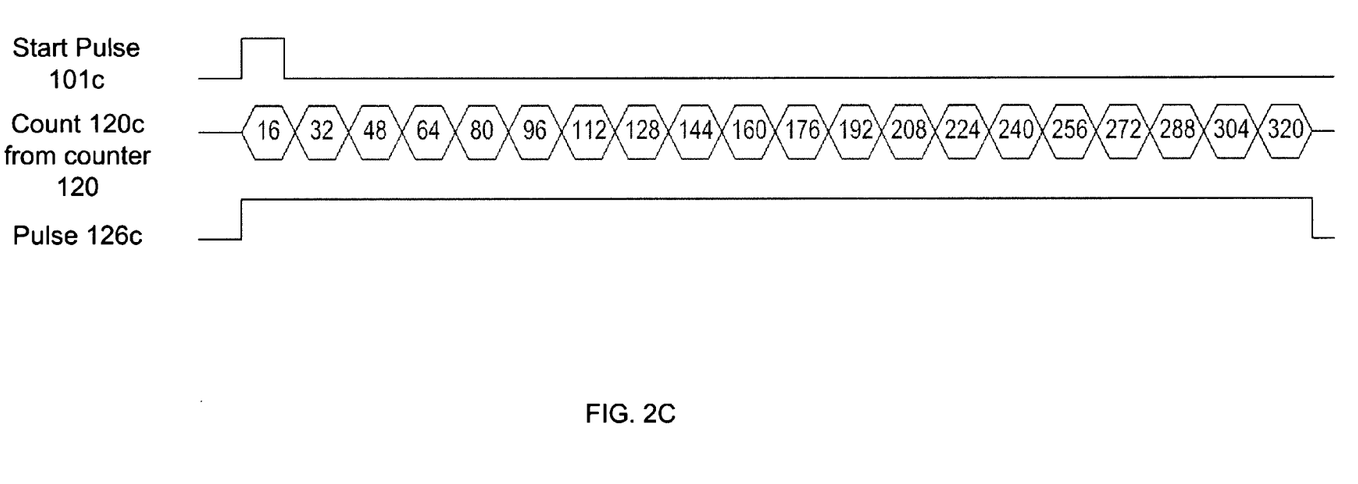
FIG. 2C shows a third exemplary pulse generated by one embodiment of the pulse width modulator.

The scaled pulse width generated by the third multiplier circuit 118 is: 10*32=320. When the start pulse 101 is asserted, the output pulse 126 goes high and the counter 120 starts counting to the desired pulse width (i.e., 320) by the count by value (i.e., 16). The counter 120 takes 320/16=20 counts to count to 320. Thus, the output pulse 126 goes low when the count from the counter 120 reaches 320 in 20 counts. The waveforms of the start pulse 101c, the count 120c output by the counter 120, and the output pulse 126c in this example are illustrated in FIG. 2C.

Figure 3:
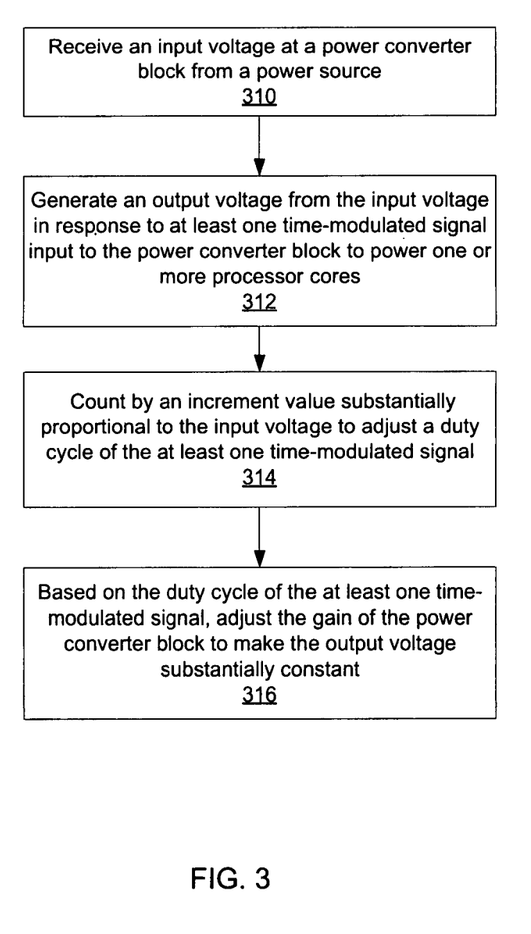
FIG. 3 illustrates one embodiment of a process to regulate voltage supply.

FIG. 3 shows one embodiment of a process to regulate voltage supply. The process is performed by processing logic that may comprise hardware (e.g., circuitry, dedicated logic, etc.), software (such as a program operable to run on a general-purpose computer system or a dedicated machine), or a combination of both.

In one embodiment, processing logic receives an input voltage at a power converter block from a power source (processing block 310). Using the power converter block, processing logic generates an output voltage from the input voltage in response to at least one time-modulated signal input to the power converter block to power one or more processor cores (processing block 312). Processing logic counts by an increment value substantially proportional to the input voltage to adjust a duty cycle of the at least one time-modulated signal (processing block 314). Based on the duty cycle of the at least one time-modulated signal, processing logic adjusts the gain of the power converter block to make the output voltage substantially constant (processing block 316). As such, the output voltage of the power converter block may remain substantially constant when the input voltage varies.

FIG. 4A illustrates one embodiment of a power block in a computing system. The power block 400 includes a input voltage sensor ("$V_{in}$ sensor") 410, two power converter blocks 420 and 425, a number of processor cores 440, and a voltage regulator controller 460. The voltage supply 401 is input to the power converter blocks 420 and 425 as well as the $V_{in}$ sensor 410. An output voltage from each of the power converter blocks 420 and 425 is input to the processor cores 440 to power the processor cores 440. The processor cores input one or more signals to the voltage regulator controller 460, which also receives an input from the $V_{in}$ sensor 410. The voltage regulator controller 460 outputs a time-modulated signal to the power converter blocks 420 and 425.

In some embodiments, the processor cores 440, the $V_{in}$ sensor 410, and the voltage regulator controller 460 reside on a common integrated circuit substrate as indicated by the dotted box 412. Alternatively, the processor cores 440, the $V_{in}$ sensor 410, and the voltage regulator controller 460 may reside on different integrated circuit substrates.

Note that any or all of the components and the associated hardware illustrated in FIG. 4A may be used in various embodiments of the power block 400. However, it should be appreciated that other configurations of the power block may include one or more additional devices not shown in FIG. 4A.

In some embodiments, the power converter blocks 420 and 425 convert the input supply voltage 401 into an output voltage 409 in response to the time-modulated signal 465 from the voltage regulator controller 460. Based on the duty cycle of the time-modulated signal 465, the gain of each of the power converter blocks 420 and 425 is adjusted to make the output voltage 409 substantially constant even when the input supply voltage 401 fluctuates. Details of some embodiments of the voltage regulator controller 460 have been described above.

In some embodiments, the power converter block 420 is external to the other components of the power block 400, such as the processor cores 440. In other words, the power converter block 420 resides on a different substrate than the other components of the power block 400. Alternatively, the power converter block 420 may reside on a common substrate with the other components of the power block 400.

Each of the voltage regulating blocks 420 and 425 may correspond to a phase of the supply voltage. In the embodiment shown in FIG. 4A, there are two power converter blocks 420 and 425, and thus, there are two phases of the supply voltage generated. It should be appreciated that there may be different numbers of voltage regulating blocks in different embodiments to generate different numbers of phases (e.g., 3, 4, etc.). Furthermore, the power converter blocks 420 and 425 may be substantially identical. For the purpose of illustration, one embodiment of the power converter block 420 is described in details below with reference to FIG. 4B.

Referring to FIG. 4B, the power converter block 420 includes a first n-type transistor 421, a second n-type transistor 423, a transistor driver 422, an inductor 425, and a capacitor 427. The gates of both the n-type transistors 421 and 423 are coupled to the transistor driver 422 to receive the time-modulated signal from the voltage regulator controller 460. In some embodiments, the transistor driver 422 splits the time-modulated signal into an upper driver signal 467 and a lower driver signal 469 to input to the n-type transistors 421 and 423, respectively. The drains of both the n-type transistors 421 and 423 are coupled together to a first end of the inductor 425. A second end of the inductor 425 is coupled to a first end of the capacitor 427 to output the output voltage 409. The second end of the capacitor 427 and the source of the second n-type transistor 423 are coupled to ground. The power converter block 420 receives the input supply voltage 401 at the source of the first n-type transistor 421. The input supply voltage 401 fluctuates or varies over time in different embodiments. The assertion time of the first n-type transistor 421 and the second n-type transistor 423 may be mutually exclusive. The duty cycle may be defined as the assertion time of the first n-type transistor 421 by the assertion period.

Figure 5:
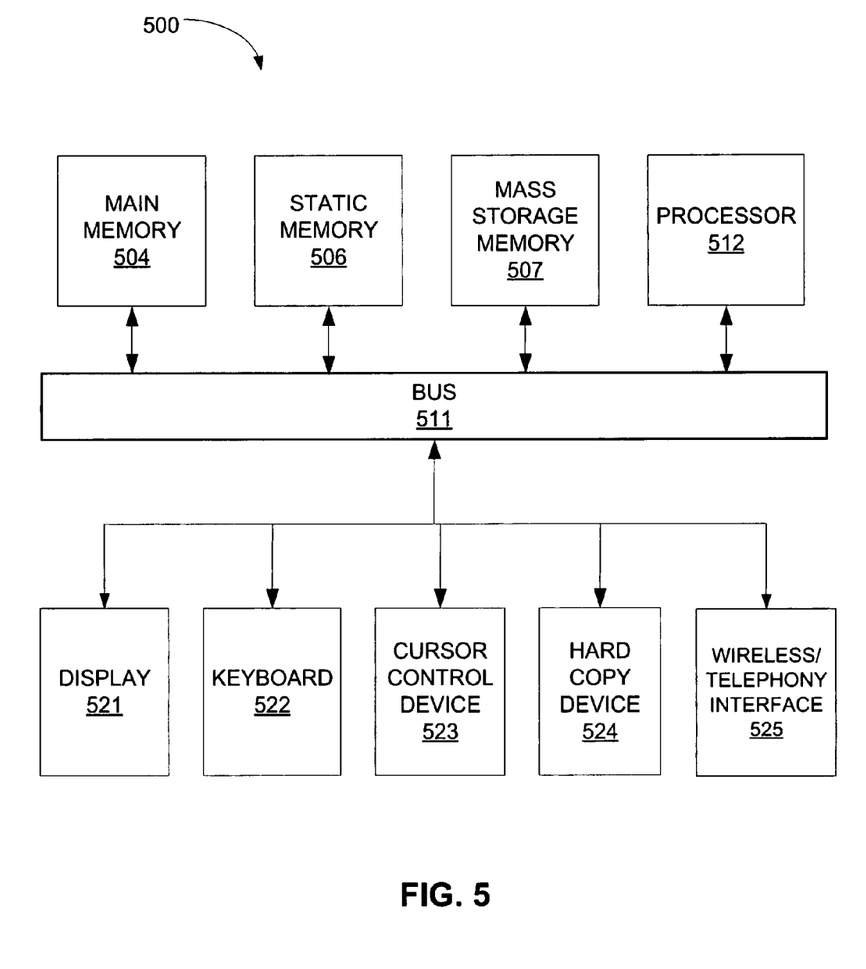
FIG. 5 illustrates an exemplary embodiment of a computing system.

FIG. 5 shows an exemplary embodiment of a computer system 500 usable with some embodiments of the power block described above. Computer system 500 includes a communication mechanism or bus 511 for communicating information, and a processor 512 coupled with bus 511 for processing information. Processor 512 includes one or more processor cores powered by some embodiments of the power block described above.

Computer system 500 further includes a random access memory (RAM), or other dynamic storage device 504 (referred to as main memory) coupled to bus 511 for storing information and instructions to be executed by processor 512. Main memory 504 also may be used for storing temporary variables or other intermediate information during execution of instructions by processor 512.

Computer system 500 also includes a read only memory (ROM) and/or other static storage device 506 coupled to bus 511 for storing static information and instructions for processor 512, and a data storage device 507, such as a magnetic disk or optical disk and its corresponding disk drive. Mass storage device 507 is coupled to bus 511 for storing information and instructions.

Computer system 500 may further be coupled to a display device 521, such as a cathode ray tube (CRT) or liquid crystal display (LCD), coupled to bus 511 for displaying information to a computer user. An alphanumeric input device 522, including alphanumeric and other keys, may also be coupled to bus 511 for communicating information and command selections to processor 512. An additional user input device is cursor control 523, such as a mouse, trackball, track pad, stylus, or cursor direction keys, coupled to bus 511 for communicating direction information and command selections to processor 512, and for controlling cursor movement on display 521.

Another device that may be coupled to bus 511 is hard copy device 524, which may be used for printing instructions, data, or other information on a medium such as paper, film, or similar types of media. Furthermore, a sound recording and playback device, such as a speaker and/or microphone may optionally be coupled to bus 511 for audio interfacing with computer system 500. Another device that may be coupled to bus 511 is a wired/wireless telephony interface 525 to communicate with a telephone or handheld palm device over a wired or wireless network.

Note that any or all of the components and the associated hardware illustrated in FIG. 5 may be used in various embodiments of the computer system 500. However, it should be appreciated that other configurations of the computer system may include one or more additional devices not shown in FIG. 5. Furthermore, one should appreciate that the technique disclosed above is applicable to different types of system environment, such as a multi-drop environment or a point-to-point environment. Likewise, the disclosed technique is applicable to both mobile and desktop computing systems.

Some portions of the preceding detailed description have been presented in terms of symbolic representations of operations on data bits within a computer memory. These descriptions and representations are the tools used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations described herein. This apparatus may be specially constructed for the required purposes, or it may comprise a general-purpose computer selectively activated or reconfigured by a computer program stored in the computer. Such a computer program may be stored in a machine-accessible storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, embodiments of the present invention are not described with reference to any particular programming language. It will be appreciated that a variety of programming languages may be used to implement the teachings as described herein.

The foregoing discussion merely describes some exemplary embodiments of the present invention. One skilled in the art will readily recognize from such discussion, the accompanying drawings and the claims that various modifications can be made without departing from the spirit and scope of the subject matter.

What is claimed is:

1. An integrated circuit comprising:
   a voltage regulator controller to be coupled to a power converter block to input at least one time-modulated signal to the power converter block, the at least one time-modulated signal having a duty cycle, the voltage regulator controller including a circuit receiving an input value substantially proportional to the input voltage, wherein the circuit is used to adjust the duty cycle of the at least one time-modulated signal, wherein the voltage regulator controller comprises a shift register to shift a number representative of a value of the input voltage; and
   load circuitry to receive a supply voltage from the power converter block.

2. A system comprising:
   a step-down direct current (DC) to DC switching voltage regulator; and
   an integrated circuit coupled with the step-down DC to DC switching voltage regulator, the integrated circuit including
   a voltage regulator controller coupled to the step-down DC to DC switching voltage regulator to input at least one time-modulated signal to the at least one time-modulated signal having a duty cycle, the voltage regulator controller including a circuit receiving an input value substantially proportional to an input voltage, wherein the circuit is used to adjust the duty cycle of the at least one time-modulated signal, wherein the voltage regulator controller comprises a shift register to shift a number representative of a value of the input voltage.

3. An integrated circuit comprising:
   a voltage regulator controller to be coupled to a power converter block to input at least one time-modulated signal to the power converter block, the at least one time-modulated signal having a duty cycle, the voltage regulator controller including a circuit receiving an input value substantially proportional to the input voltage, wherein the circuit is used to adjust the duty cycle of the at least one time-modulated signal, wherein the voltage regulator controller comprises one or more multipliers to multiply the input voltage by a predetermined value and the circuit comprises a counter; and
   load circuitry to receive a supply voltage from the power converter block.

4. The apparatus of claim 3, further comprising the power converter block having:
   a first n-type field effect transistor (FET) having a gate, a source, and a drain;
   a second n-type FET having a gate, a source, and a drain, the drain of the second n-type FET coupled to the drain of the first n-type FET, the gate of the second n-type FET and the gate of the first n-type FET coupled to the voltage regulator controller via a transistor driver;

an inductor having a first end and a second end, the first end coupled to the drain of the n-type FET; and a capacitor coupled between the second end of the inductor and ground.

5. The apparatus of claim 4, wherein the power converter block is operable to receive an input voltage at the source of the first n-type FET and to receive the time-modulated signal from the voltage regulator controller to generate the output voltage at the second end of the inductor in response to the time-modulated signal, the output voltage to remain substantially constant.

6. A method comprising:
receiving an output voltage generated from an input voltage in response to at least one time-modulated signal;
powering load circuitry with the output voltage;
counting by an increment value substantially proportional to the input voltage to adjust a duty cycle of the at least one time-modulated signal; and
adjusting the duty cycle of the at least one time-modulated signal in response to a change in the input voltage to cause the output voltage to remain substantially constant, wherein adjusting the duty cycle of the at least one time-modulated signal comprises
using a counter to count by the increment value, and
causing the at least one time-modulated signal to transition from a first logic value to a second logic value when a count from the counter reaches a predetermined value.

7. The method of claim 6, further comprising:
multiplying the input voltage by a predetermined value.

8. The method of claim 6, further comprising:
shifting a number representing a value of the input voltage by a predetermined number of bits.

9. A machine-accessible medium that provides instructions that, if executed by a processor, will cause the machine to perform operations comprising:
receiving an output voltage generated from an input voltage in response to at least one time-modulated signal;
powering load circuitry with the output voltage;
counting by an increment value substantially proportional to the input voltage to adjust a duty cycle of the at least one time-modulated signal; and
adjusting the duty cycle of the at least one time-modulated signal in response to a change in the input voltage to cause the output voltage to remain substantially constant, wherein adjusting the duty cycle of the at least one time-modulated signal comprises
using a counter to count by the increment value, and
causing the at least one time-modulated signal to transition from a first logic value to a second logic value when a count from the counter reaches a predetermined value.

10. The machine-accessible medium of claim 9, wherein the operations further comprise:
multiplying the input voltage by a predetermined value.

11. The machine-accessible medium of claim 9, wherein the operations further comprise:
shifting a number representing a value of the input voltage by a predetermined number of bits.

12. A system comprising:
a step-down direct current (DC) to DC switching voltage regulator; and
an integrated circuit coupled with the step-down DC to DC switching voltage regulator, the integrated circuit including
a voltage regulator controller coupled to the step-down DC to DC switching voltage regulator to input at least one time-modulated signal to the at least one time-modulated signal having a duty cycle, the voltage regulator controller including a circuit receiving an input value substantially proportional to an input voltage, wherein the circuit is used to adjust the duty cycle of the at least one time-modulated signal, wherein the voltage regulator controller comprises one or more multipliers to multiply the input voltage by a predetermined value and the circuit comprises a counter.

13. The system of claim 12, further comprising:
one or more processor cores coupled to the voltage regulator controller, the one or more processor cores to be powered by the output voltage.

14. The system of claim 13, wherein the voltage regulator controller and the one or more processor cores reside on a common integrated circuit substrate.

15. The system of claim 12, further comprising a power converter block including:
a first n-type field effect transistor (FET) having a gate, a source, and a drain;
a second n-type FET having a gate, a source, and a drain, the drain of the second n-type FET coupled to the drain of the first n-type FET, the gate of the second n-type FET and the gate of the first n-type FET coupled to the voltage regulator controller via a transistor driver;
an inductor having a first end and a second end, the first end coupled to the drain of the second n-type FET; and
a capacitor coupled between the second end of the inductor and ground.

* * * * *